(12) United States Patent  (10) Patent No.: US 6,310,894 B1
Counterman  (45) Date of Patent: Oct. 30, 2001

(54) METHOD AND APPARATUS FOR SERVICE MULTIPLEXING OVER TELEPHONE NETWORKS WHICH EMPLOY BRIDGED TAP CONSTRUCTION

(75) Inventor: Raymond C. Counterman, Canton, MA (US)

(73) Assignee: Verizon Laboratories Inc., Waltham, MA (US)

( * ) Notice: Subject to any disclaimer, the term of this patent is extended or adjusted under 35 U.S.C. 154(b) by 0 days.

(21) Appl. No.: 09/197,966

(22) Filed: Nov. 23, 1998

(51) Int. Cl.[7] .................................................. H04J 1/00
(52) U.S. Cl. ........................ 370/484; 370/493; 375/222; 375/260
(58) Field of Search ................................. 370/260, 480, 370/484, 486, 487, 488, 485, 463, 465, 467, 352, 353, 354, 358, 359, 493; 379/93.01, 93.04, 93.06, 93.07; 375/200, 266

(56) References Cited

U.S. PATENT DOCUMENTS

| | | | |
|---|---|---|---|
| 5,512,937 | * | 4/1996 | Beierle ................................... 348/14 |
| 5,539,777 | * | 7/1996 | Grube et al. ........................ 375/316 |
| 5,627,836 | * | 5/1997 | Conoscenti et al. ................. 370/397 |
| 5,668,857 | | 9/1997 | McHale ............................. 379/93.07 |
| 5,784,683 | * | 7/1998 | Sistanizadeh et al. ................ 455/5.1 |
| 5,790,550 | * | 8/1998 | Peeters et al. ....................... 370/480 |
| 5,796,424 | * | 8/1998 | Ely et al. ............................... 348/15 |
| 5,812,786 | * | 9/1998 | Seazholtz et al. .................... 709/233 |
| 5,878,047 | * | 3/1999 | Ganek et al. ........................ 370/486 |
| 5,930,340 | * | 7/1999 | Bell .................................. 379/93.08 |
| 5,949,763 | * | 9/1999 | Lund .................................. 370/261 |
| 5,982,785 | * | 11/1999 | Woerner et al. ..................... 370/488 |

* cited by examiner

Primary Examiner—Chau Nguyen
Assistant Examiner—Soon-Dong Hyun
(74) Attorney, Agent, or Firm—Leonard Charles Suchyt; James K. Weixel

(57) ABSTRACT

A method and apparatus for service multiplexing over telephone networks which employ bridged tap construction to allow the simultaneous delivery of different services to physically separated subscribers over a shared single pair of wires. Service is provided to one or more subscribers by connecting them to an open-circuited branch or directly with the working portion of the shared line. Service filters are used at appropriate locations in the network topology to couple or isolate the different communication channels. The wire pairs are used to simultaneously carry different services to physically separated subscribers, i.e., a portion of a common line carries one service to one location and a second service to another location. Telecommunication services are partitioned to occupy separate frequency bands in the spectrum of the transmission line using frequency division multiplexing (FDM) techniques. The location of the terminating point for each service is different and flexible as facilitated by the use of bridged taps, service drop connections and appropriate filtering. Inverse multiplexing, a method of combining multiple physical links (e.g., telephone lines) into a single, virtual communication link, is used to increase transmission bandwidth. The simultaneous delivery of different telecommunication services over a common line to physically separated subscribers may be used in conjunction with inverse multiplexing to increase and/or vary the transmission bandwidth to individual subscribers.

38 Claims, 8 Drawing Sheets

METHOD AND APPARATUS FOR SERVICE MULTIPLEXING OVER TELEPHONE NETWORKS WHICH EMPLOY BRIDGED TAP CONSTRUCTION

FIELD OF THE INVENTION

The present invention generally relates to the field of data communications. More specifically, the present invention concerns a method and apparatus for simultaneously delivering different communication services to physically separated subscribers over a single, shared pair of communication wires, as well as inverse multiplexing multiple physical links into a single, higher bandwidth virtual link.

BACKGROUND OF THE INVENTION

Communication systems, such as the telephone system (e.g., the Public Switched Telephone Network or PSTN) typically employ bridged taps, which are open circuit cable pair segments constructed such that multiple branches of a single pair share a common origin. Bridged taps are provided so that a common pair of wires can serve different subscribers. The common pair of wires passes more than one subscriber location, with each location having an access point for connecting the subscriber's service drop wire to the common pair. Bridged taps are commonly incorporated into telephone distribution networks in order to provide plant flexibility for future additions, or for changes in service demands.

FIGS. 1 and 2 illustrate two different types of bridged tap constructions. Shown in FIG. 1 is a tree-type topology bridged tap construction in which a number of cable pairs (collectively bundle 102) emanate from respective line cards at the central office 104. At point 106, bridged tap 107 connects to cable pair 109. Bridged tap 107 is a cable pair within bundle 108, which includes a number of cable pairs, only one of which is shown in the drawing. Bridged tap 112, which is within bundle 110, is shown as a continuation of cable pair 109. Similar to bundle 108, bundle 110 contains a number of cable pairs, only one of which is shown (112). Connected to cable pair 112 is a drop cable which provides service access for subscriber 114. The topology of FIG. 1 is "tree-type" in that the bridged taps resemble interconnecting branches of a tree. In contrast, the bridged tap construction of FIG. 2 is a bus-type construction in that the distribution path from the central office is a single path, with no branching paths.

Such bridged tap construction results in a cable layout having one or more cables starting at a common origin. Each of these cables may have branches, and the branches may in turn have additional branches. The resulting topology is the tree-type topology having branching cables with no closed loops. Alternatively, where there is no branching, the topology may reduce to a bus-type topology in the case of a single cable with one or more subscribers attached to the shared common line.

A class of digital subscriber line transmission methods (e.g., ADSL, VDSL) use a single pair of wires to provide both narrowband and broadband services to a subscriber using frequency division multiplexing. This is illustrated in FIG. 3. At the network side of the line, narrowband and broadband services are coupled onto the line at the same location (e.g., at the central office or at a remotely located service node). Specifically, narrowband services are coupled via line card 120, while broadband services are coupled via ADSL modem 122. The narrowband and broadband services are coupled onto cable pair 112 within bundle 102 via respective service filters 124 and 126. Alternatively, the narrowband and broadband services may be coupled onto the line at different locations on the network side of the line (e.g., Plain Old Telephone Service POTS coupled onto the line at the central office and ADSL coupled onto the line at a remotely located service node).

At the subscriber side of the line, the services are separated at the end of the drop at the customer premises 128 using respective service filters 130 and 132. The service filters used in combining and separating services may be such as those described in U.S. Pat. Nos. 5,627,501 and 5,528,630, the contents of which are incorporated herein by reference. For example, a filter may be located at the end of the drop wire which couples the telephone service onto the existing in-premises telephone wiring and isolates the broadband service from the telephone wire pairs. Alternatively, the two service filters 130, 132 at the customer premises 128 may be combined into one apparatus, for example, a POTS-type splitter. A metallic wire pair has information carrying capacity (bandwidth) available in the unused frequency spectrum of the channel. In the case of a POTS line, the frequency spectrum from 0–4 kHz may be used for POTS, while the upper portion may be used for ISDN, ADSL or VDSL.

The number of metallic wire pairs in adequate condition may be insufficient to support full market deployment of broadband services using the existing telephone network infrastructure, because certain limitations exist on the number and quality of wire pairs in the distribution cables. The number of wire pairs that pass each premises is usually limited. For example, in the case of residential premises, the number of wire pairs that pass the premises is typically two pairs, with a minimum of one and a maximum of about five pairs. It is estimated that the number of pairs available may be insufficient to meet the demand for services.

Several aspects of the existing telephone network infrastructure limit the information carrying capacity (bandwidth orbit rate) of the individual lines. These factors include: (1) the type of cables and the use of bridged taps; (2) the condition of the plant; and (3) the noise picked up by the network. Also, a reduction in capacity may result from restricted use of particular frequency bands (e.g., amateur radio bands) because of potential radio frequency interference. These factors will reduce either the usable bandwidth available for broadband service (bit rate) or the length of the working line (reach).

SUMMARY OF THE INVENTION

The present invention allows the simultaneous delivery of different services to physically separated subscribers over a shared single pair of wires. Service is provided to one or more subscribers by connecting them to an open-circuited branch or directly with the working portion of the shared line. Service filters are used at appropriate locations in the network topology to couple or isolate the different communication channels. The wire pairs are used to simultaneously carry different services to physically separated subscribers, i.e., a portion of a common line carries one service to one location and a second service to another location. Telecommunication services are partitioned to occupy separate frequency bands in the spectrum of the transmission line using frequency division multiplexing (FDM) techniques. The location of the terminating point for each service is different and flexible as facilitated by the use of bridged taps, service drop connections and appropriate filtering.

Inverse multiplexing is a method of combining multiple physical links (e.g., telephone lines) into a single, virtual communication link with increased transmission bandwidth. For example, three T1 lines each having a capacity of 1.544 Mbps may be multiplexed to provide an aggregate capacity of 4.6 Mbps between two telephone offices. Similarly, other types of services may be multiplexed, such as ADSL or VDSL.

The simultaneous delivery of different telecommunication services over a common line to physically separated subscribers may be used in conjunction with inverse multiplexing to increase and/or vary the transmission bandwidth to individual subscribers.

The present invention leverages existing bridged tap construction to free up additional wire pairs in the distribution cable for service delivery.

BRIEF DESCRIPTION OF THE DRAWINGS

Other objects, features and advantages of the invention discussed in the above brief explanation will be more clearly understood when taken together with the following detailed description of an embodiment which will be understood as being illustrative only, and the accompanying drawings reflecting aspects of that embodiment, in which.

DETAILED DESCRIPTION OF THE PREFERRED EMBODIMENTS

Figure 1:
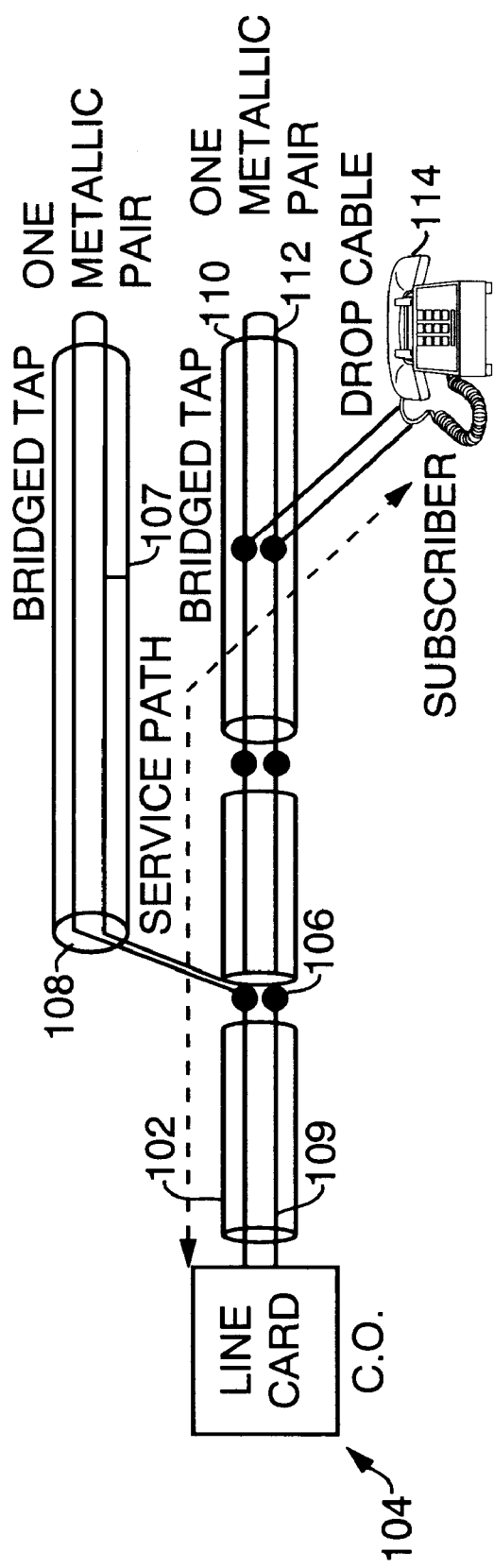
FIG. 1 is an illustration of telephone network wiring incorporating a tree and branch topology bridged tap.
Figure 2:
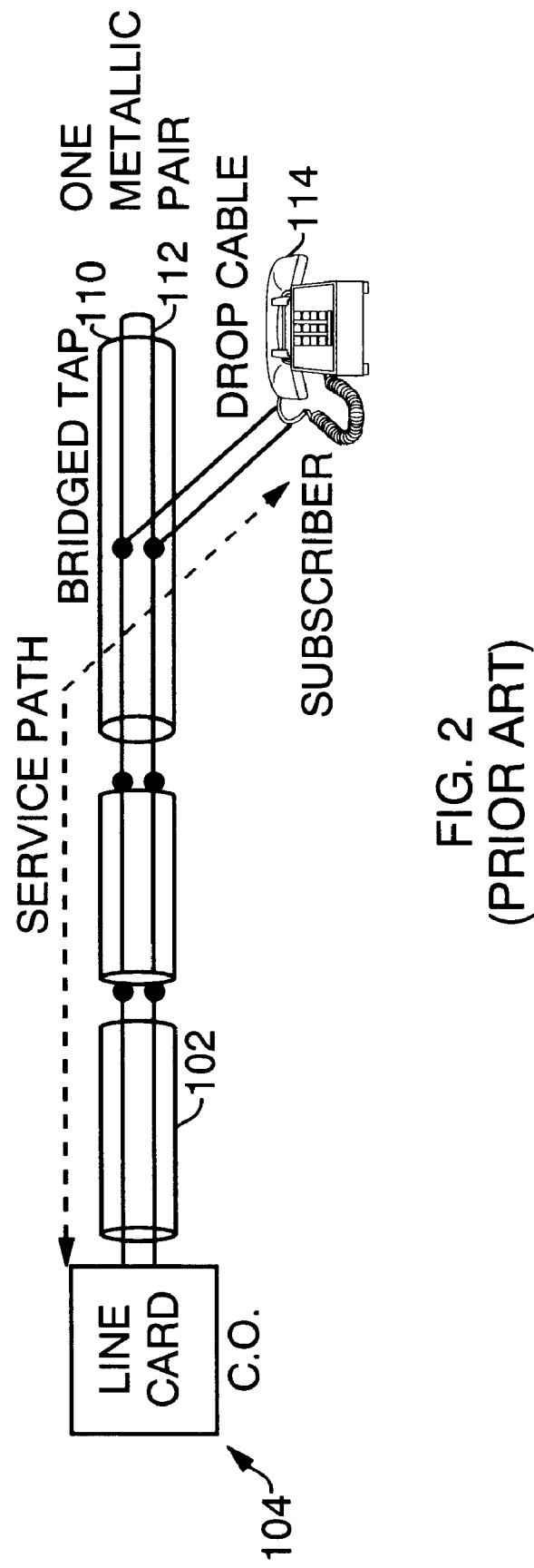
FIG. 2 is an illustration of telephone network wiring incorporating a bus topology bridged tap.
Figure 3:
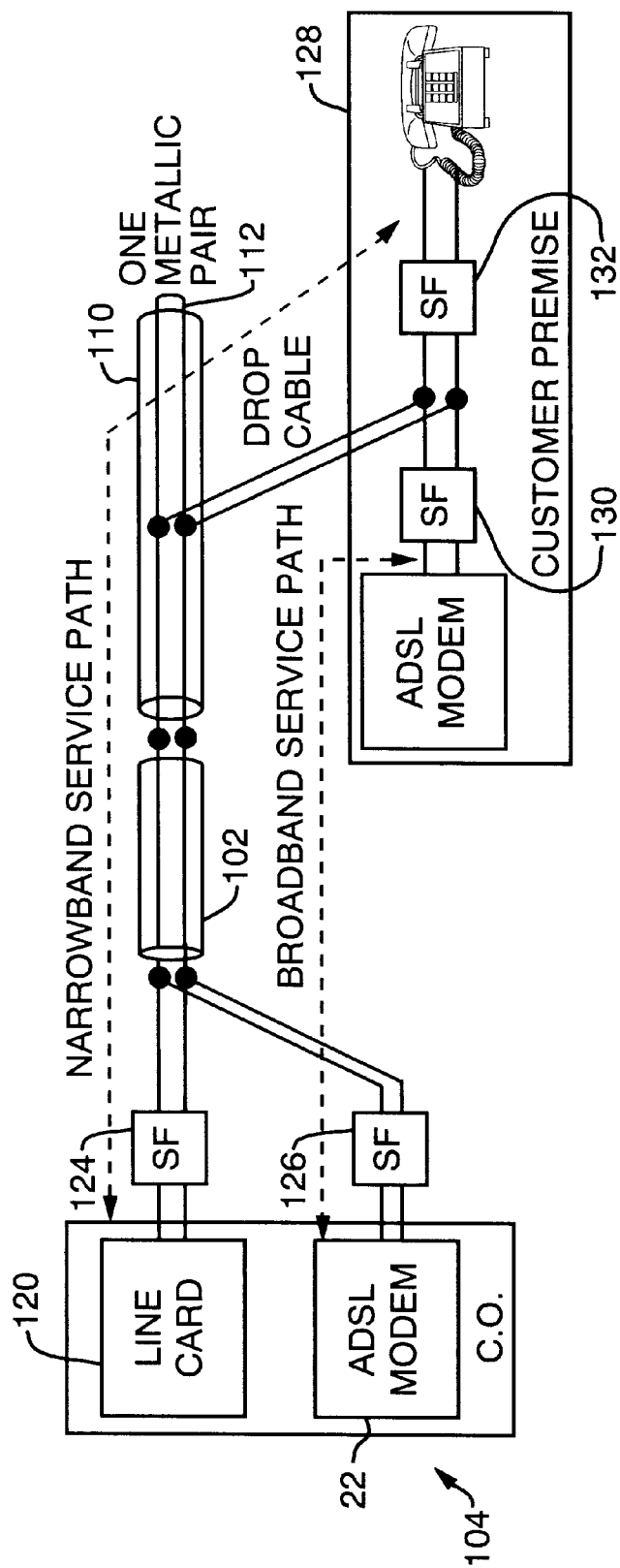
FIG. 3 is an illustration of telephone network wiring incorporating service filters.
Figure 4:
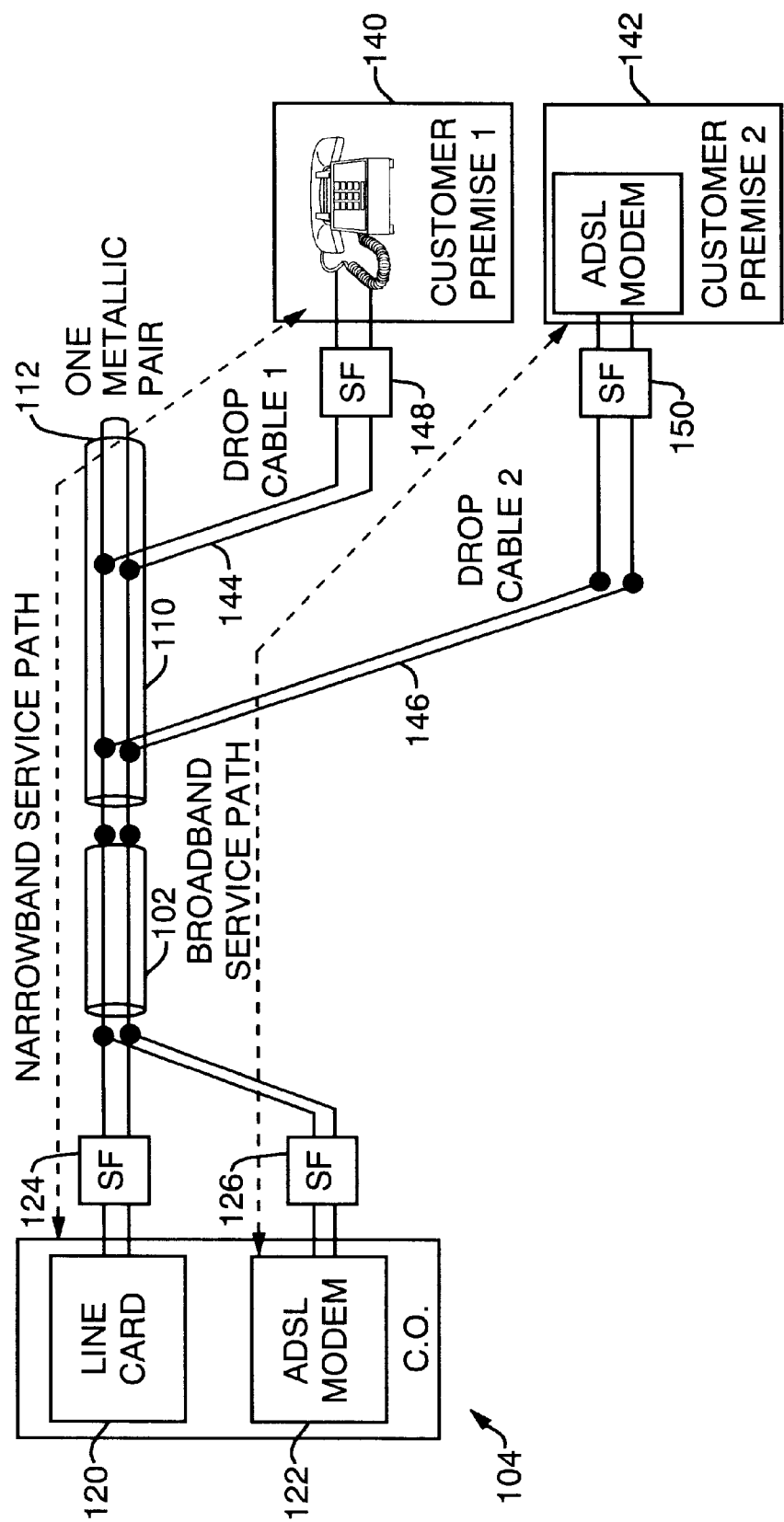
FIG. 4 is an illustration of telephone network wiring incorporating service multiplexing over a bus topology bridged tap.

FIG. 4 is a block diagram illustrating the simultaneous delivery of different services to physically separated subscribers over a shared single pair of wires in a bus-type network topology. At the network side of the line, narrowband and broadband services via line card 120 and ADSL modem 122, respectively, are coupled onto a wire pair (112) within bundle 102. While the broadband service is illustrated in this example as being an ADSL modem, it should be understood that other types of services may be used, such as, for example, VDSL. The narrowband service may be POTS service. The coupling of the different services is accomplished using service filters 124 and 126 which act to insert an information signal into and/or extract a received information signal from a particular frequency band. The service filters prevent the different frequency band signals from interfering with each other. Such couplers are well known in the art and typically utilize some form of transformer coupling along with variable impedances in the different frequency ranges to selectively transmit (or impede the transmission of) signals in different portions of the frequency spectrum. Specific reference may be made to U.S. Pat. Nos. 5,528,630 and 5,627,501 for details regarding exemplary service filters.

The narrowband service is ultimately delivered to customer premises 140, while the broadband service is delivered to a different customer premises 142. At the customer side, drop cables 144 and 146 are connected between wire pair 112 and the customer premises 140 and 142, respectively. Drop cable 144 is connected to customer premises 140 via service filter 148. Similarly, drop cable 146 is connected to customer premises 142 via service filter 150. The service filters 148, 150 may be located at the point connecting the drop cables to the distribution cable (110), or between the end of the drop cable and the in-premises wiring at each of the customer premises 140, 142, or they may be connected as part of the in-premises wiring. Service filter 148 prevents the broadband signal from interfering with the signal and equipment at customer premises 140. Similarly, service filter 150 prevents the narrowband signal from interfering with the signal and equipment located at customer premises 142.

Figure 5:
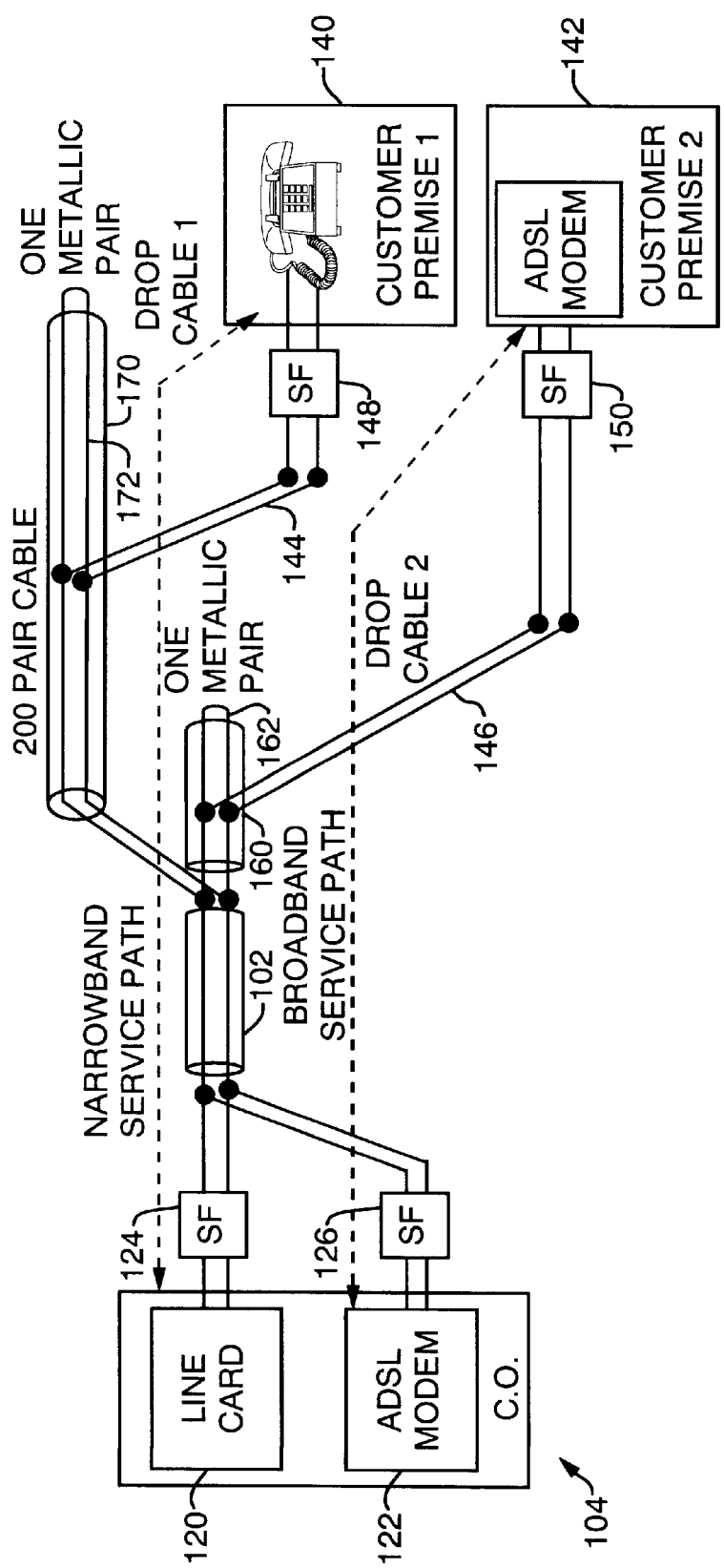
FIG. 5 is an illustration of telephone network wiring incorporating service multiplexing over a tree and branch topology bridged tap.

FIG. 5 is a block diagram illustrating the simultaneous delivery of different services to physically separated subscribers over a shared single pair of wires, similar to FIG. 4. However, in FIG. 5, the communication services are delivered over a tree and branch topology. One of the main distinctions between the topology of FIG. 5 and that of FIG. 4, is that in FIG. 5 the drop cable (144) is connected between cable bundle 170 and customer premises 140. Cable bundle 170 is itself a bridged tap emanating from cable bundle 102, and drop cable 144 is connected to wire pair 172 within cable bundle 170. Drop cable 146 is similarly connected between wire pair 162 of bridged tap 160 and customer premises 142. Essentially, in the tree and branch topology of FIG. 5, one branch of the distribution network (bridged tap 170) provides customer premises 140 with narrowband service, while a second branch (bridged tap 160) provides customer premises 142 with broadband service.

Figure 6:
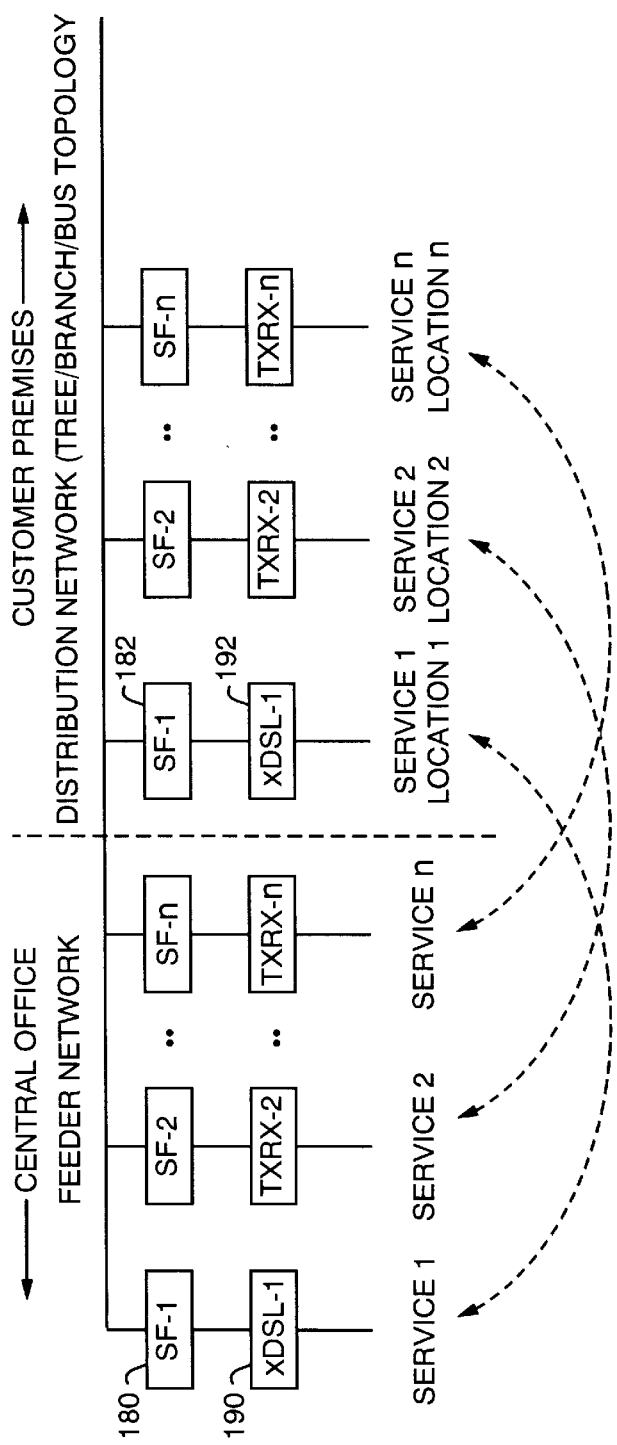
FIG. 6 is an illustration of service multiplexing of frequency division multiplexed signals.

A general model for "n" services, i.e., the distribution of "n" services to different customer premises, is illustrated in FIG. 6. As shown in FIG. 6, there are "n" service filters 180 (SF-1, SF-2, . . . SF-n) connected to a common wire pair at the feeder side (central office) of the network, and "n" service filters 182 (SF- 1, SF-2, . . . SF-n) connected to the same common wire pair at the customer premises side of the network. Different services, such as POTS, ISDN (Integrated Services Digital Network) and ADSL are generated and received at service transceivers located at the feeder side (190) and customer premises side (192) of the network. The service transceivers are denoted "TXRX-n" or "xDSL-n", the latter indicating the applicable class of digital subscriber line. The term "xDSL" includes ADSL, VDSL and other DSL (digital subscriber line) which utilize the frequency spectrum above the standard POTS voice channel, i.e., above 4 kHz. In the example shown in FIG. 6, there are "n" transceivers 190 on the feeder side of the network, and "n" transceivers 192 on the customer premises side of the network. For each communication service being provided, there is one transceiver 190 supporting that service at the feeder side of the network and one transceiver 192 supporting the service at the customer premises side of the network.

The equipment connected to the feeder network (e.g., service filters 180, transceivers 190) may be located at the central office or at locations remote from the central office.

The equipment connected to the customer premises (e.g., service filters 182, transceivers 192) is flexible in relation to the drop cable and premises wiring for that particular customer premises. However, each service filter 182 and transceiver 192 is dedicated to a single communication service being delivered to that customer premises.

Figure 7:
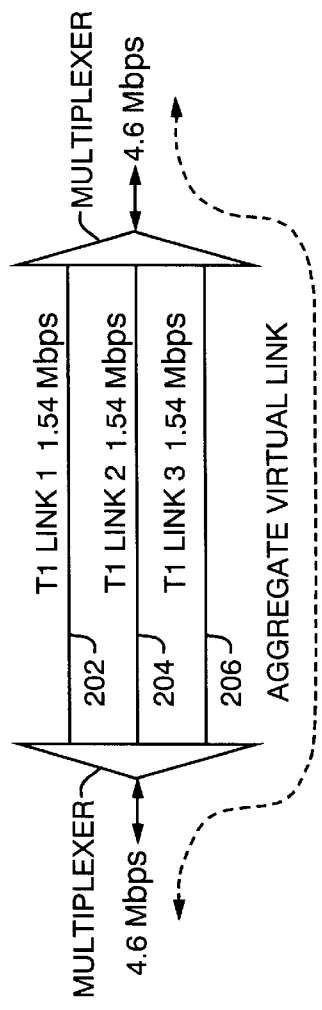
FIG. 7 is an illustration of inverse multiplexing.

According to the present invention, inverse multiplexing may be used in conjunction with frequency division multiplexing employing service filters, as described above, to increase the transmission bandwidth to a particular customer premises. Inverse multiplexing refers to the capability to combine multiple physical links (e.g., multiple telephone lines) into a single virtual link. An example of inverse multiplexing is shown in FIG. 7 where three T1 lines (202, 204, 206), each having a bandwidth of 1.544 Mbps are used to deliver approximately 4.6 Mbps full-duplex communication over a virtual link. In this manner, inverse multiplexing may be used to combine the service capacity of two or more digital subscriber lines.

Figure 8:
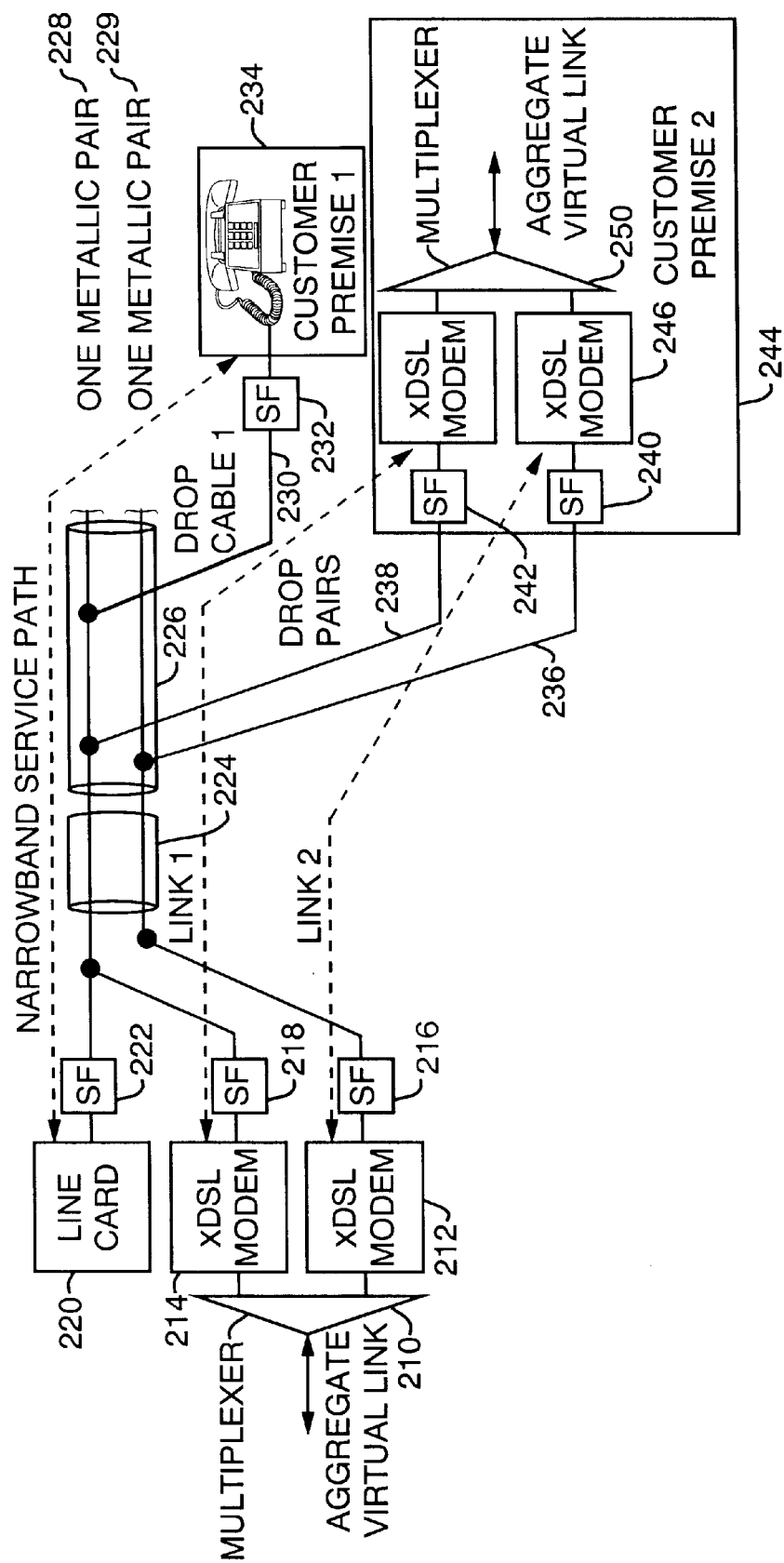
FIG. 8 is an illustration of telephone network wiring incorporating inverse multiplexing of frequency division multiplexed signals.

A specific application of the concept shown in FIG. 7 is shown in FIG. 8, whereby broadband service is delivered over two xDSLs to a customer premises at one location, while narrowband (standard telephone service) is delivered to a different customer premises at a different location. Referring now to FIG. 8, a multiplexer 210 is located at the central office side of the network wiring and is connected to an aggregate "virtual" link on one side and to two xDSL modems 212, 214 on the other side. The signals through xDSL modems 212, 214 are isolated via service filters 216, 218 and then connected to wire bundle 224. Also at the central office side of the network wiring, narrowband service may be provided via line card 220 and service filter 222 connected to wiring bundle 224. According to the present invention, the narrowband signal (via service filter 222) and an xDSL signal (via service filter 218) are connected to the same wire pair 228 within bundle 224. An additional xDSL signal (via service filter 216) is connected to wire pair 229 within bundle 224. The signals travel through wire bundle 224 onto bridged tap 226 which is located at the customer side of the network wiring.

At the customer side of the network wiring, a drop cable (230) connects from the wiring pair 228 to a first customer premises 234 in order to deliver the narrowband service to customer premises 234. Connected between drop cable 230 and customer premises 234 is a service filter 232 which is used to isolate the signal being delivered to customer premises 234.

Similarly, drop cables 236 and 238 connect from the wiring pairs 229 and 228, respectively, to a second customer premises 244 in order to deliver the xDSL (or other broadband) signals on those wire pairs to customer premises 244. Each of the drop cables 236, 238 is connected to a respective service filter 240, 242 for signal isolation. From the service filters 240, 242, the broadband signals pass through respective modems 246, 248 and onto a multiplexer 250 which presents at its output an aggregate "virtual" link at customer premises 244. In this way, narrowband service is delivered to a first customer location and broadband service as an aggregate "virtual" link is delivered to a different customer location, using the same wiring pair.

In the example shown in FIG. 8, the various service filters may be located at the point connecting the drop cable to the bundle, or between the end of the drop cable and the in-premises (customer) wiring, or as part of the in-premises wiring. In the preferred embodiment according to the present invention for inverse multiplexing xDSL service, the service filters are located between the end of the drop cable and the building (customer) wiring. Also, the xDSL modem and multiplexing functions may be implemented using the same network apparatus. At the central office side of the network wiring, the xDSL modem/multiplexer may be located at the central office or at locations remote from the central office. At the premises side of the network wiring, the xDSL modem/multiplexer may be located at the end of the drop cable, typically at the customer premises itself.

In the example illustrated in FIG. 8, if each xDSL carries 1 Mbps to customer premises 244, then the aggregate virtual link capacity to the customer premises is approximately 2 Mbps. Of course, more than two xDSL signals may be multiplexed into an aggregate virtual link, depending on the particular system requirements and needs.

Figure 9:
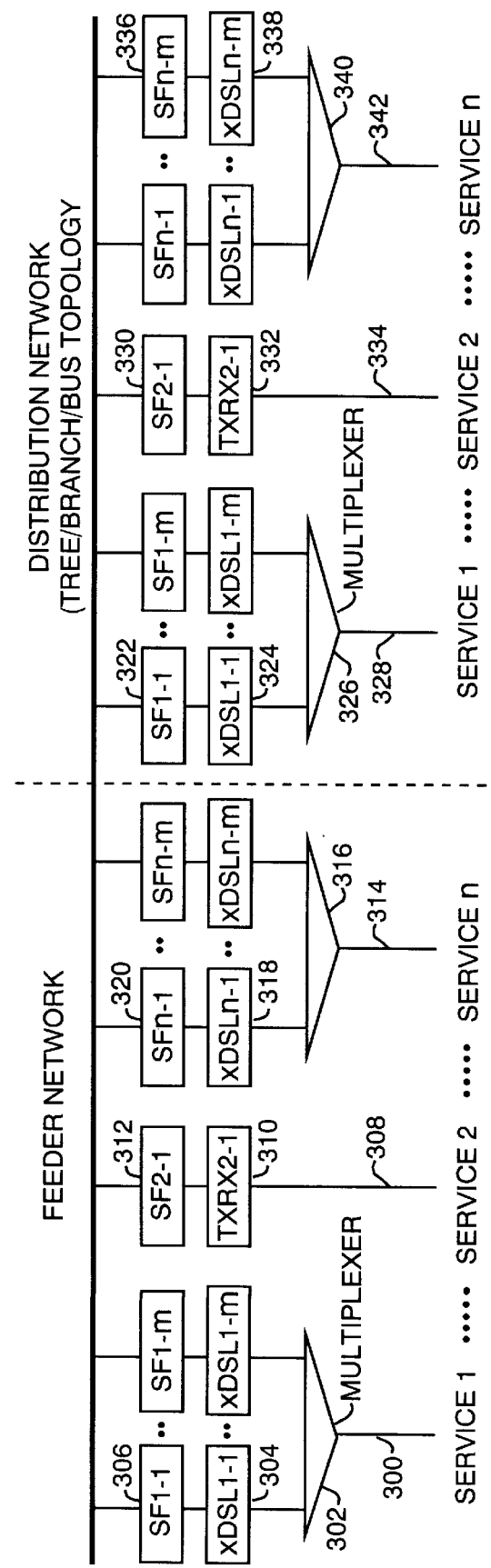
FIG. 9 is an illustration of inverse multiplexing combined with service multiplexing of frequency division multiplexed signals.

FIG. 9 illustrates a general model for "n" services, i.e., the distribution of "n" services to different customer premises, similar to that illustrated in FIG. 6. However, in FIG. 9, some of the services utilize the principle of inverse multiplexing set out above. For example, as shown in FIG. 9, a service or signal 300 at the feeder or central office side of the network wiring may in fact represent an aggregate virtual link of "m" different xDSL signals which is delivered to a customer premises as follows. First, a multiplexer 302 separates the aggregate signal 300 for handling by "m" separate xDSL modems 304 (designated xDSL1-1 through xDSL1-m). Each xDSL modem 304 is connected to a respective service filter 306 (designated SF1-1 through SF1-m) for signal isolation. The signals from the service filters 306 are transmitted in much the same fashion as discussed above in connection with FIG. 6 and FIG. 8.

At the customer premises side of the network wiring, service filters 322 (designated SF1-1 through SF1-m) direct the individual xDSL signal streams to respective xDSL modems 324 (designated xDSL1-1 through xDSL1-m) for processing. The signals are then provided to a multiplexer 326 which outputs an aggregate virtual signal 328 to the customer premises.

In the composite model of FIG. 9, a service may use one or more digital transmission lines (xDSL) for inverse multiplexing. There are "n" such services in the example of FIG. 9, with each service having anywhere from 1 to "m" transceivers on each side of the network wiring (i.e., the central office side and the customer premises side) to transmit and receive signals on each line. The transceivers may be xDSL modems, ISDN modems, telephone line codecs, or any device used for providing a service over a metallic wire pair. Similar to FIG. 6, the transceivers are denoted either as TXRX-n or xDSL-n, the latter indicating the applicable class of digital subscriber lines. For each service, there are also 1 to "m" service filters on each side of the network wiring in order to isolate the service from other services that may share the same line.

While the invention has been particularly shown and described with reference to a preferred embodiment thereof, it will be understood by those skilled in the art that various changes in form and details may be made therein without departing from the spirit and scope of the invention.

What is claimed is:

1. A method of delivering different communication services to different premises, comprising:
   coupling a first one of said communication services onto a first communication path for transmission;
   demultiplexing an aggregate virtual link communication service into a plurality of individual ones of said communication services;

coupling a first one of said plurality of individual ones of said communication services onto said first communication path for transmission;

transmitting said first one of said communication services and said first one of said plurality of individual ones of said communication services over said first communication path;

decoupling said first one of said communication services from said first communication path and delivering said first one of said communication services to a first one of said premises;

decoupling said first one of said plurality of individual ones of said communication services from said first communication path and delivering said first one of said plurality of individual ones of said communication services to a second one of said premises, wherein said first one of said premises is different from said second one of said premises;

coupling a second one of said plurality of individual ones of said communication services onto a second communication path for transmission;

decoupling said second one of said plurality of individual ones of said communication services from said second communication path; and multiplexing said first and second ones of said plurality of individual ones of said communication services into a reconstructed aggregate virtual link communication service and delivering said reconstructed aggregate virtual link communication service to the second one of said premises.

2. The method of claim 1, wherein said first one of said communication services is a narrowband service and said aggregate virtual link communication service is a broadband service.

3. The method of claim 2, wherein said narrowband service includes POTS service and said broadband service includes xDSL service.

4. The method of claim 1, wherein said decoupling of said first one of said communication services includes the use of a first drop cable connected between said first communication path and said first one of said premises, and said decoupling of said first one of said plurality of individual ones of said communication services includes the use of a second drop cable connected between said first communication path and said second one of said premises.

5. The method of claim 1, wherein said first communication path comprises a metallic wire pair.

6. A method of delivering different communication services to different premises, comprising:

coupling a first one of said communication services onto a first communication path for transmission;

demultiplexing an aggregate virtual link communication service into a plurality of individual ones of said communication services;

coupling a first one of said plurality of individual ones of said communication services onto said first communication path for transmission;

transmitting said first one of said communication services and said first one of said plurality of individual ones of said communication services over said first communication path;

further transmitting said first one of said communication services using a bridged tap communication path connected to said first communication path;

decoupling said first one of said communication services from said bridged tap communication path and delivering said first one of said communication services to a first one of said premises;

decoupling said first of one said plurality of individual ones of said communication services from said first communication path and delivering said first one of said plurality of individual ones of said communication services to a second one of said premises, wherein said first one of said premises is different from said second one of said premises;

coupling a second one of said plurality of individual ones of said communication services onto a second communication path for transmission;

decoupling said second one of said plurality of individual ones of said communication services from said second communication path; and multiplexing said first and second ones of said plurality of individual ones of said communication services into a reconstructed aggregate virtual link communication service and delivering said reconstructed aggregate virtual link communication service to the second one of said premises.

7. The method of claim 6, wherein said first one of said communication services is narrowband service and said aggregate virtual link communication service is a broadband service.

8. The method of claim 7, wherein said narrowband service includes POTS service and said broadband service includes xDSL service.

9. The method of claim 6, wherein said decoupling of said first one of said communication services includes the use of a first drop cable connected between said bridged tap communication path and said first one of said premises, and said decoupling of said first one of said plurality of individual ones of said communication services includes the use of a second drop cable connected between said first communication path and said second one of said premises.

10. The method of claim 6, wherein said first communication path and said bridged tap communication path each comprise a metallic wire pair.

11. A method of delivering different communication services to different premises, comprising:

coupling a first one of said communication services onto a first communication path for transmission using a first service filter;

demultiplexing an aggregate virtual link communication service into a plurality of individual ones of said communication services;

coupling a first one of said plurality of individual ones of said communication services onto said first communication path for transmission using a second service filter;

coupling a second one of said plurality of individual ones of said communication services onto a second communication path for transmission using a third service filter;

transmitting said first one of said communication services and said first and second ones of said plurality of individual ones of said communication services using said first and second communication paths;

decoupling said first one of said communication services from said first communication path using a fourth service filter and delivering said first one of said communication services to a first one of said premises;

decoupling said first and second ones of said plurality of individual ones of said communication services from said first and second communication paths, respectively, using a fifth and a sixth service filter; and multiplexing said first and said second ones of said plurality of individual ones of said communication services into a reconstructed aggregate virtual link communication service and delivering said reconstructed aggregate virtual link communication service to a second one of said premises, wherein said first one of said premises is different from said second one of said premises.

12. The method of claim 11, wherein said first one of said communication services is a narrowband service and said aggregate virtual link communication service is a broadband service.

13. The method if claim 12, wherein said narrowband service includes POTS service and said broadband service includes a plurality of xDSL links.

14. The method of claim 11, wherein said decoupling of said first one of said communication services includes the use of a first drop cable connected between said first communication path and said first one of said premises, and said decoupling of said first and second ones of said plurality of individual ones of said communication services includes the use of respective drop cables connected between said first and said second communication paths on the one hand and said second one of said premises on the other hand.

15. The method of claim 14, wherein at least one of said service filters is located between one of said communication paths and one of said drop cables.

16. The method of claim 11, wherein at least one of said first and second communication paths comprises a metallic wire pair.

17. The method of claim 11, wherein at least one of said service filters is located at one of said premises.

18. A communication system which delivers different communication services to different premises, comprising:

a first service filter that couples a first one of said communication services onto a first communication path for transmission;

a demultiplexer that demuliplexes an aggregate virtual link communication service into a plurality of individual ones of said communication services;

a second service filter that couples a first one of said plurality of individual ones of said communication services onto said first communication path for transmission;

a third service filter that decouples said first one of said communication services from said first communication path, subsequent to transmission over said first communication path, and delivers said first one of said communication services to a first one of said premises;

a fourth service filter that decouples said first one of said plurality of individual ones of said communication services from said first communication path, subsequent to transmission over said communication path, and delivers said first one of said plurality of individual ones of said communication services to a second one of said premises, wherein said first one of said premises is different from said second one of said premises;

a fifth service filter that couples a second one of said plurality of individual ones of said communication services onto a second communication path for transmission;

a sixth service filter that decouples said second one of said plurality of individual ones of said communication services from said second communication path; and a multiplexer that multiplexes said first and second one of said plurality of individual ones of said communication services into a reconstructed aggregate virtual link communication service and delivers said reconstructed aggregate virtual link communication service to the second one of said premises.

19. The system of claim 18, wherein said first one of said communication services is a narrowband service and said aggregate virtual link communication service is a broadband service.

20. The system of claim 19, wherein said narrowband service includes POTS service and said broadband service includes xDSL service.

21. The system of claim 18, wherein said decoupling of said first one of said communication services includes the use of a drop cable connected between said first communication path and said first one of said premises, and said decoupling of said first one of said plurality of individual ones of said communication services includes the use of a second drop cable connected between said first communication path and said second one of said premises.

22. The system of claim 21, wherein at least one of said service filters is located between said first communication path and one of said drop cables.

23. The system of claim 18, wherein said first communication path comprises a metallic pair.

24. The system of claim 18, wherein at least one of said service filters is located at one of said premises.

25. A communication system which delivers different communication services to different premises, comprising:

a first service filter that couples a first one of said communication services onto a first communication path for transmission over the first communication path;

a demultiplexer that demuliplexes an aggregate virtual link communication service into a plurality of individual ones of said communication services;

a second service filter that couples a first one of said plurality of individual ones of said communication services onto said first communication path for transmission over said first communication path;

a bridged tap communication path connected to said first communication path and that transmits said first one of said communication services;

a third service filter that decouples said first one of said communication services from said bridged tap communication path and delivers said first one of said communication services to a first one of said premises;

a fourth service filter that decouples said first one of said plurality of individual ones of said communication services from said first communication path and delivers said first one of said plurality of individual ones of said communication services to a second one of said premises, wherein said first one of said premises is different from said second one of said premises;

a fifth service filter that couples a second one of said plurality of individual ones of said communication services onto a second communication path for transmission;

a sixth service filter that decouples said second one of said plurality of individual ones of said communication services from said second communication path; and a multiplexer that multiplexes said first and second ones of said plurality of individual ones of said communication services into a reconstructed aggregate virtual link communication service and delivers said reconstructed aggregate virtual link communication service to the second one of said premises.

26. The system of claim 25, wherein said first one of said communication services is a narrowband service and said aggregate virtual link communication service is a broadband service.

27. The system of claim 26, wherein said narrowband service includes POTS service and said broadband service includes xDSL service.

28. The system of claim 25, wherein said decoupling of said first one of said communication services includes the use of a first drop cable connected between said bridged tap communication path and said first one of said premises, and said decoupling of said first one of said plurality of individual ones of said communication services includes the use of a second drop cable connected between said first communication path and said second one of said premises.

29. The system of claim 28, wherein at least one of said service filters is located between said first communication path and one of said first and second drop cables.

30. The system of claim 25, wherein said first communication path and said bridged tap communication path each comprises a metallic wire pair.

31. The system of claim 25, wherein at least one of said service filters is located at one of said premises.

32. A system for delivering different communication services to different premises, comprising:

a first service filter that couples a first one of said communication services onto a first communication path for transmission;

a demultiplexer that demultiplexes an aggregate virtual link communication service into a plurality of individual ones of said communication services;

a second service filter that couples a first one of said plurality of individual ones of said communication services onto said first communication path for transmission;

a third service filter that couples a second one of said plurality of individual ones of said communication services onto a second communication path for transmission;

transmitting said first one of said communication services and said first and second of said plurality of individual ones of said communication services using said first and second communication paths;

a fourth service filter that decouples said first one of said communication services from said first communication path, subsequent to transmission, and delivers said first one of said communication services to a first one of said premises;

a fifth and sixth service filter that decouples said first and second ones of said plurality of individual ones of said communication services, respectively, from said first and second communication paths, subsequent to transmission; and a multiplexer that multiplexes said first and said second ones of said plurality of individual ones of said communication services into a reconstructed aggregate virtual link communication service and delivers said reconstructed aggregate virtual link communication service to a second one of said premises, wherein said first one of said premises is different from said second one of said premises.

33. The system of claim 32, wherein said first one of said communication services is a narrowband service and said aggregate virtual link communication service is a broadband service.

34. The system of claim 33, wherein said narrowband service includes POTS service and said broadband service includes a plurality of xDSL links.

35. The system of claim 32, wherein said decoupling of said first one of said communication services includes the use of a first drop cable connected between said first communication path and said first one of said premises, and said decoupling of said first and second ones of said plurality of individual ones of said communication services includes the use of respective drop cables connected between said first and said second communication paths on the one hand and said second one of said premises on the other hand.

36. The system of claim 35, wherein at least one of said service filters is located between one of said communication paths and one of said drops cables.

37. The system of claim 32, wherein at least one of said first and second communication paths comprises a metallic wire pair.

38. The system of claim 32, wherein at least one of said service filters is located at one of said premises.

* * * * *